June 11, 1963 J. W. KULYK 3,093,388
LIFTABLE LOAD WHEEL ASSEMBLAGE
Filed Dec. 4, 1961 3 Sheets-Sheet 1
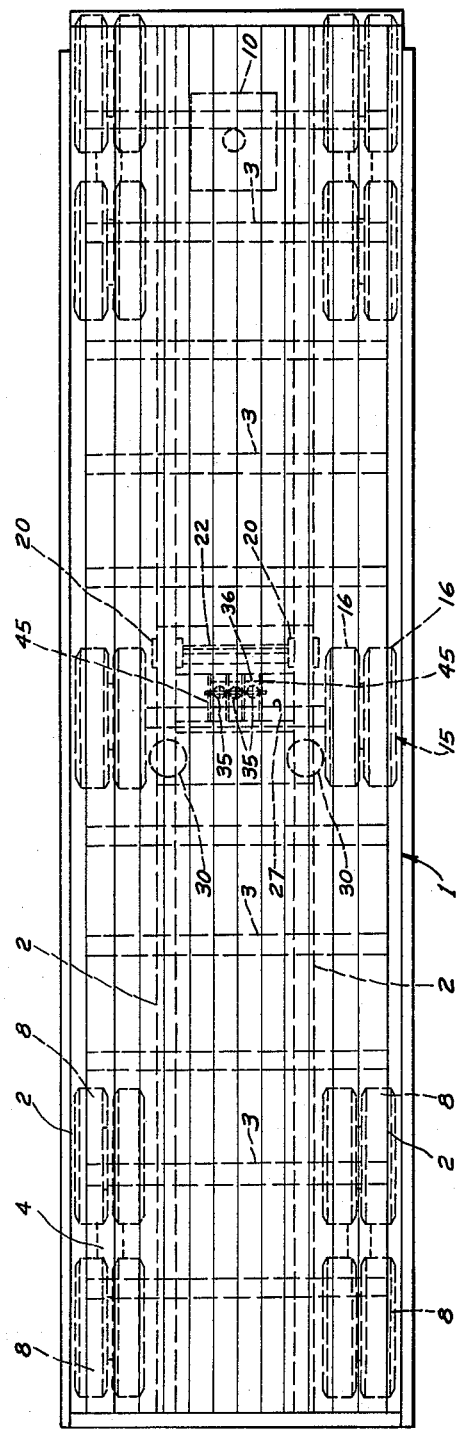
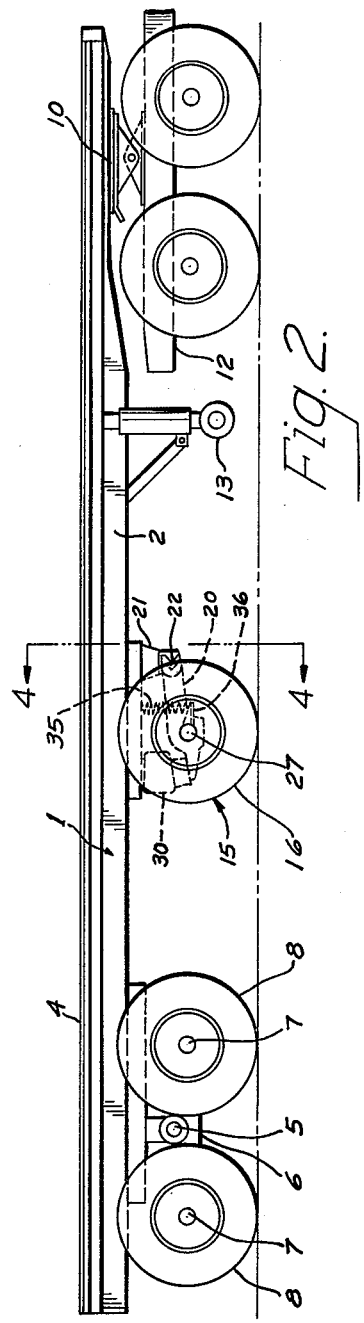
INVENTOR.
John W. Kulyk,
BY
ATTORNEY.

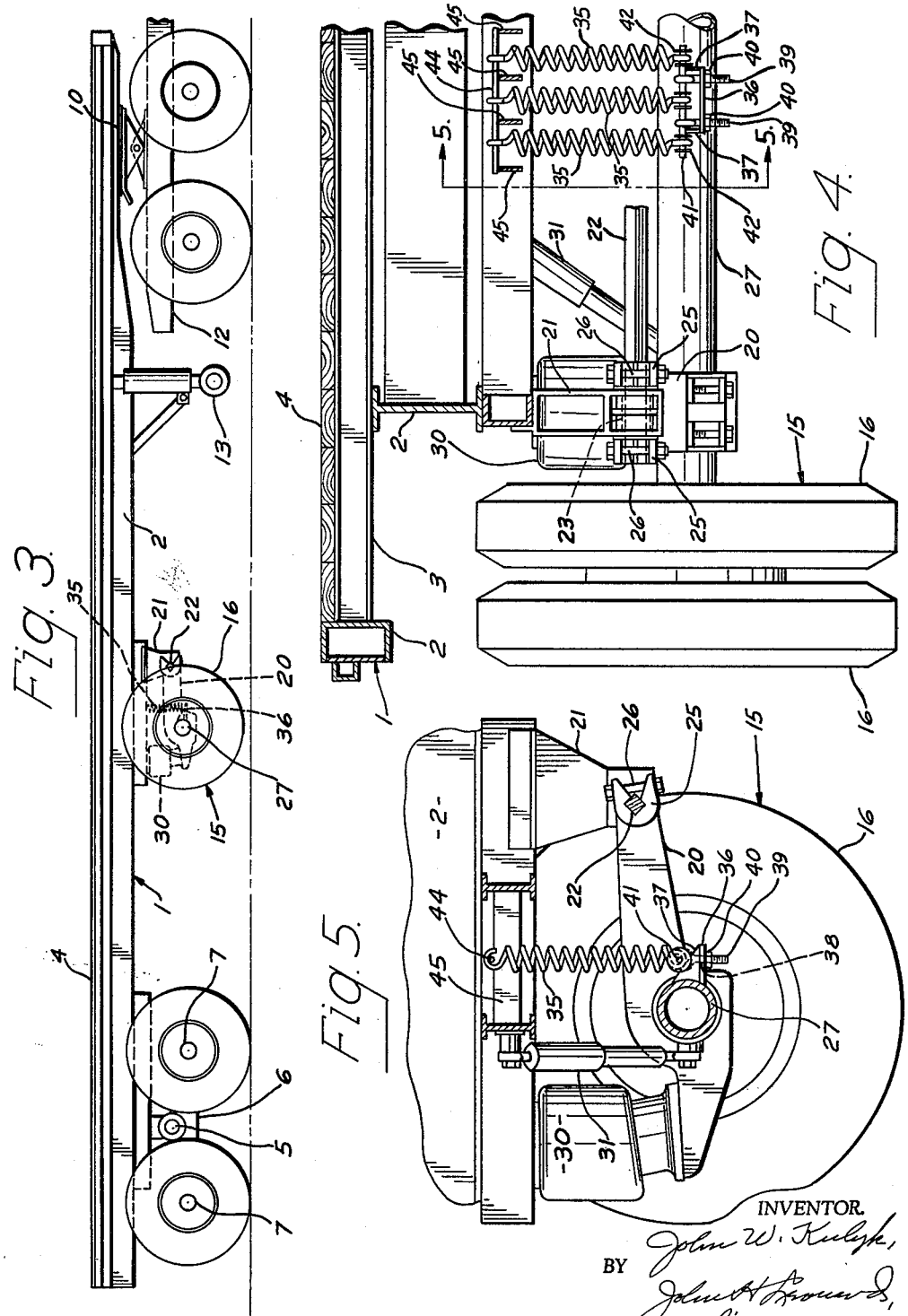
June 11, 1963 — J. W. KULYK — 3,093,388
LIFTABLE LOAD WHEEL ASSEMBLAGE
Filed Dec. 4, 1961 — 3 Sheets-Sheet 2

June 11, 1963   J. W. KULYK   3,093,388
LIFTABLE LOAD WHEEL ASSEMBLAGE
Filed Dec. 4, 1961   3 Sheets-Sheet 3

INVENTOR.
John W. Kulyk,
BY
ATTORNEY

United States Patent Office 3,093,388
Patented June 11, 1963

3,093,388
LIFTABLE LOAD WHEEL ASSEMBLAGE
John W. Kulyk, Albion, Pa., assignor to Rogers Brothers Corporation, Albion, Pa., a corporation of Pennsylvania
Filed Dec. 4, 1961, Ser. No. 156,885
5 Claims. (Cl. 280—81)

This invention relates to highway trailers used in tractor-trailer combinations and particularly to a new and improved liftable load supporting travelling wheel assembly for use in connection with such combinations.

Heretofore, conventional highway trailers in tractor-trailer combinations include a suspension of traveling load bearing wheels mounted near the rear end of the trailer frame, and a front end support near the forward end of the frame. In the so-called semi-trailer, the front end support is a fifth wheel member mounted on the underside of the trailer frame and cooperating with a complementary fifth wheel member on the rear of a tractor. In the rarer full trailer type, a front wheel assemblage is connected to the fifth wheel of the trailer frame and, in turn, is connected to a truck or trailer. In either type, the frame is unsupported between the front end support and the rear wheel suspension.

Generally, these trailers are quite long and consequently a very heavy frame is required to support a heavy load between these widely separate front and rear load supporting points. Even when the trailer is to operate under full load in both directions between terminals, the added weight of the frame increases the cost of fuel per mile and adds to the size of tires and wear thereon. The advantage is that the trailer remains readily dirigible. The usual solution is to provide a heavier frame and a heavier rear wheel assembly. When the trailer is being operated with a full load in one direction between terminals and a light load or no load in the opposite direction, the added weight of the trailer itself causes disproportionate fuel cost per mile and excessive wear of the tires per cargo ton mile. This is because the tires are subjected to considerable wear even when the trailer is traveling light. In fact, in many instances, they are subjected to more wear with a light trailer travelling at high speed along the open highway than when loaded and traveling at a slower speed. This is due to the fact that the light trailer bounces, the wheels repeatedly lift from the pavement and lose their rotational speed, and then strike the pavement while rotating at less than travelling speed. Their inertial resistance to rapid acceleration by the frictional contact with the pavement causes slippage of the tread on the pavement with resultant rapid wear.

Generally, in such trailers, forward and rearward rocking wheel assemblages are used as the rear end support. Since the wheels are of substantial diameter, their rotational axes must be placed a substantial distance apart forwardly and rearwardly of the trailer frame. This imposes problems in turning inasmuch as there is a tendency, upon backing the trailer alongside ramps or negotiating sharp turns, for either the front or the rear wheels of the fore and aft rocking rear wheel assemblage to drag laterally across the roadway, thus subjecting the tires to severe tearing and scuffing. The heavier the trailer and load, the larger in diameter must the rear wheels be, and this requires ever greater spacing of the axles forwardly and rearwardly with ever greater lateral drag of the tires on sharp turns.

It has been proposed to use additional auxiliary wheels spaced forwardly of the rear wheel assemblage and rearwardly from the front end support so as to obtain a more evenly distributed load, enabling the use of a lighter frame. However, in such instances, the auxiliary wheels resist turning to an even greater degree, and must be dragged laterally across the road surface transversely of the trailer in making short turns at corners and for aligning the trailer alongside a ramp.

In accordance with the present invention, all of these objections are overcome by providing liftable load wheels a considerable distance forwardly from the rear wheel assemblage, and more nearly equi-distant between the front end support and the point of suspension of the frame on the rear wheel assemblage. These liftable wheels are held resiliently in firm and load supporting contact with the pavement by so-called air springs or inflatable bellows so arranged that when connected to a source of yieldable fluid pressure, such as compressed air, they force the liftable load bearing wheels downwardly relative to the trailer frame with a force proportionate to the proportion of the load they are to support. The liftable wheels are arranged so that, when desired, they can be lifted clear of the pavement whereby the trailer may travel without their engagement with the pavement.

Thus, when the trailer is transporting a heavy load at normal highway speed, the lift wheels are in their operative load supporting engagement with the pavement. However, when the loaded trailer is slowed down to a creep to negotiate a sharp turn, or to be maneuvered into position alongside a ramp or platform, the liftable wheels are lifted clear of the pavement so as not to interfere with turning or be dragged laterally of the tread while in loaded contact with the pavement.

Generally, the trailer can support on the normal rear wheel assemblage, at creeping speeds, any load which can be safely transported by the rear wheel assemblage, supplemented by liftable wheels, at the normal speeds on the open highway.

As a result, a lighter frame can be employed, thus increasing the pay load within the restrictions of State laws. Only the tires of the rear wheel assemblage are subjected to wear during light load travel, the liftable wheels being lifted clear of the pavement. This effects a substantial saving in normal wear on the tires, the liftable wheel tires being used only when needed, and the rear assembly tires being held more firmly on the pavement by the lesser load during light travel than would be the case if the liftable wheels remained on the pavement. At the same time, lateral dragging and scuffing of the liftable wheels on sharp turns is eliminated.

Various other specific objects and advantages will become apparent from the following description, wherein reference is made to the drawings in which:

FIG. 1 is a top plan view of a tractor-trailer combination with the liftable load bearing wheel assemblage of the present invention is installed;

FIG. 2 is a side elevation of the structure illustrated in FIG. 1, with the liftable assemblage in load supporting engagement with the pavement;

FIG. 3 is a view similar to FIG. 2 with the liftable assemblage suspended out of contact with the pavement;

FIG. 4 is an enlarged vertical cross sectional view taken on the line 4—4 of FIG. 2;

FIG. 5 is an enlarged vertical cross-sectional view taken on line 5—5 of FIG. 4.

Figure 6:
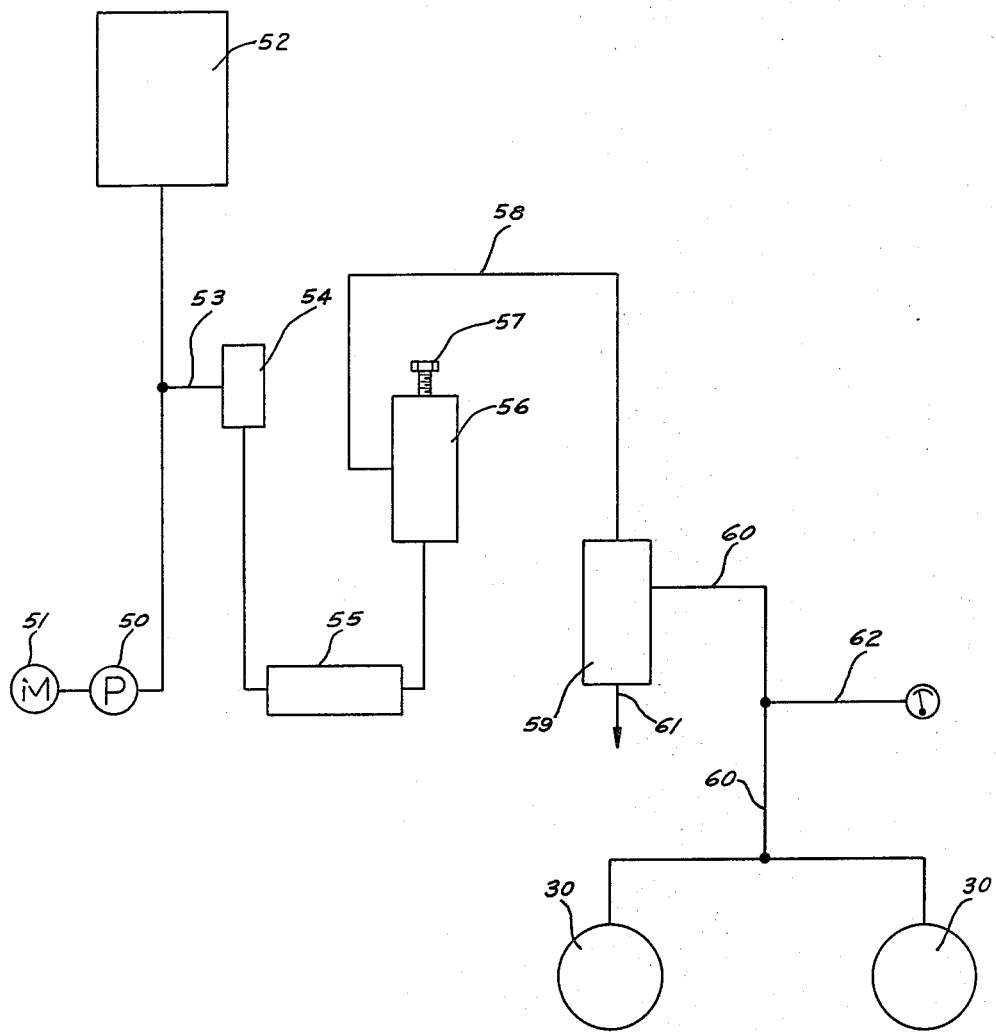
FIG. 6 is a schematic diagram showing a preferred form of fluid pressure circuit of the present invention.

Referring to the drawings, the trailer, shown for illustration, is a semi-trailer having a conventional frame 1 formed of longitudinal sills 2 and cross beams 3, supporting the usual deck 4. The rear end of the trailer frame is supported by a conventional tandem rocking wheel suspension comprising a transverse rock shaft 5 on which is mounted a pair of housings 6, each of which is rockable about the shaft 5. At its ends, each housing 6 supports front and rear axles, 7, respectively, each of which carries suitable dual wheels 8.

The front end support of the semi-trailer illustrated comprises a fifth-wheel member 10 which engages a complementary fifth wheel member 11 supported on the rear end of a tractor 12 of a conventional tractor-trailer combination. The conventional roller type landing struts 13 are provided for supporting the front end of the trailer when the tractor is detached therefrom. The structure thus far described is well known in the art.

In accordance with the present invention, a lift wheel assemblage, indicated generally at 15, is provided on the trailer frame. The assemblage comprises sets of dual ground engaging pneumatically tired travelling wheels 16 arranged one set at each side of the trailer frame and in alignment with the right and left rear wheels, respectively, of the trailer.

The air spring suspension is such that the sets of pneumatically tired wheels 16 can rise and fall independently of each other a limited amount and can resiliently support their load due to being held in the load bearing relation to the highway surface by suitable inflatable bellows.

In the form illustrated, the suspension is one known on the market and comprises a pair of rocking beams 20 which extend longitudinally of the trailer frame near the outboard longitudinal sills 2, respectively. Since the beams 20 are the same in form and function, one only will be described in detail.

Mounted on the outboard sills 2 are rigid brackets 21. A common torsion bar 22 extends from one bracket to the other and is mounted at its ends in large rubber bushings 23 bonded in the brackets, respectively, so that the bar yieldably resists rotation about its longitudinal axis extending transversely of the frame. The forward ends of the rocking beams 20 are secured to opposite ends of the torsion bar 22 for rotation therewith. In the form illustrated, the torsion bar is of square cross section and the forward ends of the beams 20 have yoke arms 25 which receive, and are clamped tightly onto, the torsion bar by means of bolts 26. The pair of rocking beams 20 support a transverse axle 27, the ends of which protrude in the outboard direction from the beams 20 and provide the pintles for the wheels 16, respectively. The axle 27 is mounted in torsional rubber mounts to allow yieldably opposed rotation of the axle through an angle of about 3½ degrees. The axle 27 is spaced a substantial distance from the axis of the torsion bar 22.

Operatively interposed between the rear ends of the beams 20 and the longitudinal sills 2 are fluid pressure operated resilient cushioning means in the form of inflatable bellows or "air springs" 30. They are arranged so that their axes extend generally upwardly and downwardly axially. These bellows generally are of rubber or like elastomeric material, corded, and reinforced much in the nature of a pneumatic automobile tire casing or tubeless tire. They are arranged to permit the introduction of air under pressure thereinto.

The air is introduced under sufficient pressure to yieldably thrust the wheels 16 against the pavement to sustain the desired portion of the weight of the loaded trailer, as will later be explained.

The torsion bar 22 is such that it continually urges the bellows 30 toward contracted condition, or upwardly, and generally is of sufficient force to lift the beams 20 and contract the bellows in the absence of the weight of the wheels 16. However, it is not sufficient to hoist the weight of the beams 20, and wheels 16, from the pavement even though the bellows are not inflated. The main effect of the torsion bar 22 is to prevent undue vibration of the assemblage.

In order to eliminate transverse swing, suitable hydraulic shock absorbers 31 of any conventional type are interposed between the rear ends of the beams 20 and the mid-sill 2 of the frame, as illustrated. The specific structure of the assembly thus far described is conventional.

In accordance with the present invention, however, the bellows is connected through suitable manipulating valves, in the cab of the tractor, to a source of pneumatic pressure so that they can be subjected to internal pneumatic pressure and expanded, so as to force the wheels 16 into load bearing contact with the ground, or vented to the atmosphere, as desired, and thereby relieve the pressure in the bellows and thus relieve the wheels 16 from load bearing. However, it is necessary that the wheels 16 be lifted so that they are clear of the pavement. Accordingly, a plurality of coil springs 35 are connected to the rocking beams 20, through the medium of the transverse axle 27, and to the frame of the trailer. These springs 35 are conventional coiled tension springs and have sufficient power so that when, the bellows 30 are vented to atmosphere, the springs swing the beams upwardly, contracting the bellows 30 and hoisting the wheels 16 clear of the pavement a substantial distance. The springs 35 are connected adjustably between the trailer frame 1 and the axle 27 so that they can be tensioned properly in relation to the weight and resistance to upward movement of the lift assemblage 15 to lift the assemblage and hold it suspended with the wheels 16 clear of the pavement upon venting of the bellows 30 to the atmosphere.

For this purpose, a suitable bracket 36 is welded to the axle 27 and reinforced by suitable gussets 37. The bracket 36 is provided with holes 38 through which extend the eye-bolts 39. The eye-bolts are threaded and are provided with nuts 40 which engage the underside of the bracket 36 for drawing the bolts downwardly. A suitable tie rod 41 extends through the eye-bolts and is provided with sets of spaced washers 42. The lower ends of the springs 35 hook onto the tie bar at a point between the washers. The upper ends of the springs 35 are connected to a suitable tie bar 44 which is supported on brackets 45 extending forwardly and rearwardly of the frame. The springs 35 are adjusted by the eye-bolts so as to assure the proper lifting of the wheels 16 clear of the pavement when the bellows are vented to the atmosphere. The springs and their connection thus provide resilient lift means for the liftable wheels.

As mentioned, it is desirable when making a sharp turn or manipulating the trailer alongside ramps and platforms that the wheels 16 be lifted and that this be accomplished from the cab of the tractor. For this purpose, the structure illustrated in FIG. 6 may be employed.

Mounted on the tractor is a suitable source of pneumatic pressure, such as a pneumatic pump 50, driven by a motor 51, and a suitable compressed air tank 52. Connecting the pump 50 and the tank 52 is a feed line 53 to which is connected a valve 54. The valve 54 is arranged to regulate the pressure to be supplied to the bellows 30. The air from the valve 54 is passed to a suitable accumulating reservoir 55 and therefrom to the inlet of a feed valve 56. The valve 56 can be adjusted, by presetting the control 57, to maintain a preselected air pressure in the bellows. The valve 56 operates to admit air into the bellows when the pressure in the bellows is less than the preset pressure and to exhaust air from the bellows when the pressure in the bellows is greater than the preset pressure. Thus the axle 27 can be made to support predetermined proportions of the total load at the will of the operator. The outlet of the valve 56 is connected by a line 58 to the inlet of a solenoid control valve 59 which is connected by the conventional wiring to a push button or control knob in the cab, and is energized from the usual battery source of the tractor. The valve 59 is operable to supply air to a line 60, and to stop the supply to the line 60 and connect it to an exhaust vent 61, selectively. A suitable pressure gauge is connected in the line 60 in advance of the bellows 30. The air pressure depends on the size of the trailer, the loads to be carried, and the size of the bellows. In any event, it is sufficient to force the wheels 16 against the roadway firmly enough to yieldably support the desired proportion of the load on the trailer.

The valve 59 preferably is of the type which, when deenergized, supplies the air pressure to the bellows 30, thus normally holding the wheels 16 in load bearing engagement with the roadway. When energized, it vents the bellows 30 to the atmosphere. This is desirable because generally the assemblage 15 is in operation, and it is desirable that, in event of failure of the electrical system, that such system fail safe, that is, in load supporting condition.

On the other hand, when it is desired to turn sharp corners and the like, the valve 59 is energized and thereupon vents the bellows 30 to the atmosphere. Upon venting them to the atmosphere, the springs 35 swing the rock beams 20 upwardly, thereby collapsing the bellows 30, lifting the wheels 16 a substantial distance above the pavement, and supporting the wheels in such raised position.

Accordingly, the wheels 16 engage the pavement only when actually being used to support a load at normal travel speed. They can be lifted readily for maneuvering the trailer around sharp turns at very slow speed and, of course, can be lifted and held out of contact with the highway surface when not required for supporting the load. Thus, by the re-arrangement, use of conventional air spring suspensions with addition of auxiliary load bearing wheels proper relocated, and modified with means for hoisting them, the advantages above enumerated result.

Having thus described my invention, I claim:

1. A trailer comprising a frame, rear supporting wheels on the frame, a front end support for the frame, rocking beam means extending longitudinally of the frame and pivotally connected to the frame for swinging upwardly and downwardly about a horizontal axis extending transversely of the frame, auxiliary wheels on the beam means, respectively, and spaced endwise of the frame from said axis and forwardly from the rear wheels and rearwardly from the front end support, inflatable air cushions interposed between the beam means and frame in spaced relation endwise of the frame from said horizontal axis and yieldably opposing upward swinging of the beams means when inflated by air under predetermined pressure, means operable to admit air under said pressure into the cushions for forcing the rocking beam means to swing downwardly to apply the auxiliary wheels to a pavement under sufficient yielding pressure to impose part of the weight of the frame, and any load thereon, on the auxiliary wheels, and to reduce the air pressure in the cushions to a predetermined amount, selectively, resilient means operatively interconnecting the beam means and frame and resiliently urging the beam means upwardly with sufficient force to lift the auxiliary wheels clear of the pavement when the said air pressure is reduced to said predetermined amount, and said resilient means having inadequate force to swing the beam means upwardly against the resistance of the cushions while said cushions are inflated by said air under said predetermined pressure.

2. A trailer comprising a frame, rear supporting wheels on the frame, a front end support on the frame, liftable load supporting wheels between the rear wheels and front end support, wheel supporting means connecting the liftable wheels to the frame for movement relative to the frame downwardly into load supporting engagement with a pavement and upwardly to an idle position in which the liftable wheels are clear of the pavement, resilient lift means interconnecting the frame and supporting means and normally operative for lifting the supporting means to a position in which the liftable wheels are clear of the pavement and for holding the supporting means in said position, elongatable and contractible fluid pressure operated cushioning means interconnecting the frame and supporting means and operable when subjected to predetermined yieldable fluid pressure for overcoming the lift means and for applying force resiliently to the supporting means, by expansion and contraction while subjected to said predetermined yieldable fluid pressure, thereby to hold the liftable wheels against the pavement resiliently under yielding fluid pressure sufficient to impose part of the weight of the loaded frame yieldably on the liftable wheels and operable when subjected to a predetermined different fluid pressure for releasing the supporting means and thereby permitting retraction of the supporting means by the lifting means for lifting the liftable wheels from the pavement, a circuit connecting the cushioning means to a source of yieldable fluid pressure, and control means in said circuit and operable to control the fluid pressure to which the cushioning means are subjected so that the cushioning means can be subjected to said predetermined fluid pressure and said predetermined different fluid pressure, selectively.

3. The structure according to claim 2 wherein the connections of the liftable wheels to the frame are nearer to that frame portion which is midway between the connections to the frame of the front end support and of the rear wheels, respectively, than said liftable wheel connections are to the connections to the frame of the front end support and of the rear wheels, respectively.

4. A trailer according to claim 2 wherein said fluid pressure operated resilient cushioning means comprising resilient inflatable fluid containing cushions interposed operatively between the frame and supporting means for moving the supporting means downwardly upon expansion of the cushions endwise by admission of fluid under predetermined pressure thereinto and for sustaining the load by said fluid under pressure therein, and said control means comprises a source of said predetermined yielding fluid pressure, a pipe line circuit connecting the source to the cushions, and a settable valve in said circuit operable in one setting to connect the cushions to said source, and in another setting to disconnect the cushions from the source and vent them to the atmosphere.

5. A trailer according to claim 2 wherein the lift means comprise springs connected to the frame and to the supporting means and urging the supporting means upwardly with sufficient force to lift the liftable wheels clear of the ground when the cushioning means are inactive, and said springs having insufficient force to lift and support the liftable wheels against the elongating force of the cushioning means when the fluid pressure operated means are active.

References Cited in the file of this patent

UNITED STATES PATENTS

| | | |
|---|---|---|
| 2,395,640 | Pearson | Feb. 29, 1946 |
| 2,445,134 | Currell | July 13, 1948 |
| 2,731,276 | Cross | Jan. 17, 1956 |
| 2,812,193 | Grace | Nov. 5, 1957 |
| 2,848,249 | Bertsch et al. | Aug. 19, 1958 |
| 2,902,289 | North | Sept. 1, 1959 |

FOREIGN PATENTS

| | | |
|---|---|---|
| 1,010,389 | Germany | Sept. 22, 1954 |